J. D. HOUSTON.
NUT LOCK.
APPLICATION FILED MAR. 23, 1914.
1,107,792.
Patented Aug. 18, 1914.
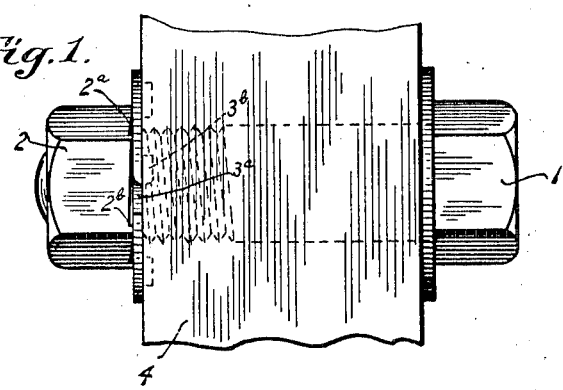
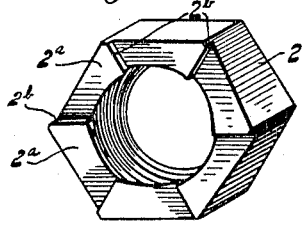
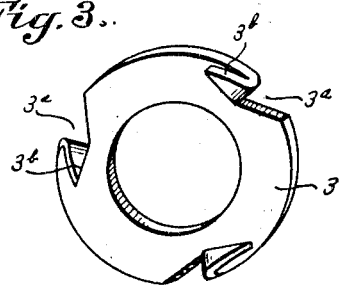
Witnesses
S. W. Brainard.
N. H. Turrell.
Inventor
James D. Houston
By Oed C. Billman
Attorney

UNITED STATES PATENT OFFICE.

JAMES D. HOUSTON, OF NEBRASKA CITY, NEBRASKA.

NUT-LOCK.

1,107,792.     Specification of Letters Patent.     Patented Aug. 18, 1914.

Application filed March 23, 1914. Serial No. 826,469.

*To all whom it may concern:*

Be it known that I, JAMES D. HOUSTON, a citizen of the United States, residing at Nebraska City, in the county of Otoe and State of Nebraska, have invented certain new and useful Improvements in Nut-Locks, of which the following is a specification.

My invention relates to improvements in nut-locks, the primary object of the invention being to provide a generally improved nut-lock of exceedingly simple, cheap, and efficient construction, without in any way impairing the efficiency of the bolt and nut.

A further object of the invention is to provide an improved locking washer adapted to engage and coöperate with the adjacent article through which the bolt is passed as well as to permit the nut to be drawn up in the usual manner and at the same time locking the latter as against a retrograde or loosening movement on the bolt.

With the above mentioned and other ends in view, the invention consists in the novel construction, arrangement, and combination of parts, hereinafter described, illustrated in some of its embodiments in the accompanying drawings, and more particularly pointed out in the appended claims.

Referring to the drawings, forming a part of this specification, Figure 1, is a view of an ordinary bolt and nut, the latter and the improved locking washer being constructed in accordance with my invention. Fig. 2, a perspective view showing the inner or under side of the improved locking nut for coöperating with the improved locking washer. Fig. 3, a similar view illustrating the inner or under side of the improved locking washer.

Similar numerals of reference designate like parts throughout all the figures of the drawings.

The improved bolt 1, may be of any suitable and convenient form, as likewise the nut 2, except that the latter is preferably provided on its inner face with a plurality or series of notched inclines or faces $2^a$, arranged in stepped relation to each other to form the toothed offset portions $2^b$.

The washer 3, is provided about its outer periphery with a plurality or series of inclined notches $3^a$, formed by means of struck-out pointed tongues or members $3^b$, the latter being bent inwardly to abut or rest against the inner or under side of the washer as shown most clearly in Fig. 3 of the drawings. The struck-out or folded tongues $3^b$, are adapted to form anchor projections to engage with the adjacent article 4, through which the bolt is passed to prevent the washer from turning when engaged by the nut 2, as shown most clearly in Fig. 1 of the drawings. If the washer abuts against a relatively soft article such as wood, or the like, the anchor projections or tongues $3^b$, will embed themselves in the adjacent article as shown in Fig. 1 of the drawings.

When the nut is drawn up the toothed portions $2^b$, of the inclines will engage with or slightly embed themselves into the adjacent face of the washer 3, the latter being prevented from turning by means of the anchor projections $3^b$, and if desired, the nut 3, may be further locked by permitting the notched faces $2^a$, to come into engagement with the notches $3^a$, in the outer periphery of the washer 3.

From the foregoing description, taken in connection with the accompanying drawings, the operation and advantages of my invention will be readily understood.

Having thus described some of the embodiments of my invention, what I claim and desire to secure by Letters Patent, is,—

1. A locking washer provided about its outer periphery with struck-out tongues folded down upon the inner side of the washer forming anchor projections.

2. In combination with a threaded bolt, a locking device therefor, comprising a washer mounted on the threaded end of said bolt and provided with struck-out peripheral anchor tongues folded upon the inner side of the washer and forming inclined peripheral notches, and a nut provided on its under side with notched inclines terminating in toothed offset portions in engagement with said washer.

In testimony whereof I have affixed my signature in presence of two witnesses.

JAMES D. HOUSTON.

Witnesses:
  R. O. MARVELL,
  JAMES T. SHEWELL.